United States Patent [19]

Yoshida

[11] Patent Number: 4,594,686

[45] Date of Patent: * Jun. 10, 1986

[54] LANGUAGE INTERPRETER FOR INFLECTING WORDS FROM THEIR UNINFLECTED FORMS

[75] Inventor: Kunio Yoshida, Nara, Japan

[73] Assignee: Sharp Kabushiki Kaisha, Osaka, Japan

[*] Notice: The portion of the term of this patent subsequent to Dec. 13, 2000 has been disclaimed.

[21] Appl. No.: 545,216

[22] Filed: Oct. 25, 1983

Related U.S. Application Data

[63] Continuation of Ser. No. 181,877, Aug. 28, 1980, abandoned.

[30] Foreign Application Priority Data

Aug. 30, 1979 [JP] Japan ............................... 54-110864

[51] Int. Cl.⁴ ............................................. G06F 15/38
[52] U.S. Cl. ..................................... 364/900; 364/419
[58] Field of Search ... 364/200 MS File, 900 MS File, 364/419

[56] References Cited

U.S. PATENT DOCUMENTS

| | | | |
|---|---|---|---|
| 3,089,258 | 5/1963 | Kavanagh | 434/157 |
| 3,312,946 | 4/1967 | Craft | 364/900 |
| 3,932,859 | 1/1976 | Kyriakides | 364/900 X |
| 4,374,412 | 2/1983 | Schaffner | 364/200 |
| 4,420,816 | 12/1983 | Yoshida | 364/900 |
| 4,420,817 | 12/1983 | Yoshida | 364/900 |

FOREIGN PATENT DOCUMENTS

| | | | |
|---|---|---|---|
| 3037480 | 4/1981 | Fed. Rep. of Germany | 364/419 |
| 2014765 | 8/1979 | United Kingdom | 179/1 SM |

OTHER PUBLICATIONS

M. Ishida et al., *Language Learning Equipment with Microcomputer*, National Technical Report (vol. 26, No. 1, Feb. 1980), pp. 146–154.

M. Amamiya et al., *Japanese Question-Answering System on the Topic of Figure Manipulations*, Review of the Electrical Communications Laboratories (vol. 26, Nos. 7-8, Jul.-Aug. 1978), pp. 1045–1055.

McDaniel, J.; Day, A. M.; Price, W. L.; Szanser, A. J.; Whelan, S.; Yates, P. M. "Machine Translation at the National Physical Laboratory", Teddington, Middlesex, England, in: Booth, A. D., ed., *Machine Translation* (New York, John Wiley & Sons, Inc., 1967), pp. 229-226, P308.B6.

Foust, W. D. "Automatic English Inflection", in: Edmundson, H. P., ed., *Proceedings of the National Symposium on Machine Translation* (Englewood Cliffs, N.J., Prentice-Hall, Inc., 1961), pp. 229-233, P308.N35.

*Primary Examiner*—James D. Thomas
*Assistant Examiner*—A. Williams
*Attorney, Agent, or Firm*—Birch, Stewart, Kolasch & Birch

[57] ABSTRACT

An electronic language interpreter is operated such that an uninflected word is entered to obtain at least one inflected form of that word. The interpreter comprises three types of memories. The first contains a plurality of words of the uninflected form inclusive in their uninflected word. The second contains a plurality of words in a second language each of which is equivalent to one of the words within the first memory. The third memory contains digital data reflecting a certain number of inflection principles used to inflect the inflected words stored in the first memory. An alphabetical keyboard is provided for entering the uninflected form of the word. An inflection selection keyboard is provided for entering desired inflection information that is used to select data reflecting the appropriate inflection principles stored digitally in the third memory. An inflection enabling circuit is responsive to the selection functions of the inflection selection keyboard for inflecting the uninflected word according to the desired inflection principles derived from the third memory, to obtain the properly inflected word.

4 Claims, 7 Drawing Figures

LANGUAGE INTERPRETER FOR INFLECTING WORDS FROM THEIR UNINFLECTED FORMS

This application is a continuation of application Ser. No. 181,877 filed on Aug. 28, 1980, now abandoned.

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differs from any conventional type of electronic device in that the former is of a unique structure which provides for efficient and rapid retrieval of word information stored in a memory. An example of such electronic dictionaries and language interpreters was disclosed in Levy, U.S. Pat. No. 4,158,236, issued June 12, 1979, "ELECTRONIC DICTIONARY AND LANGUAGE INTERPRETER".

Recently, there have been developed memory modules that will translate English into Spanish, French, Italian, German, Portugese and Japanese, and vice versa. Some of these languages, such as German, have an inflection system requiring the use of a properly inflected word which is appropriate according to its use within a sentence. In such a case, it was further desired that these portable devices have means for inflecting words on the basis of their uninflected forms.

SUMMARY OF THE INVENTION

Accordingly, it is an object of the present invention to provide a new, improved and effective language interpreter capable of inflecting words commencing from the basis of the uninflected forms.

It is another object of the present invention to provide an improved key input system for a language interpreter, the key input system controlling the operation of means for inflecting words based upon their uninflected forms.

Other objects, advantages and features of the invention together with further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to the disclosed preferred embodiments of the present invention, an electronic language interpreter is provided and operated such that an uninflected word is entered to obtain at least one inflected form of that word. The interpreter comprises three memories. The first contains a plurality of words in their uninflected form inclusive of the uninflected word. The second memory contains a plurality of words in a second language, of which is equivalent to one of the words within the first memory. The third memory contains digital data reflecting a certain number of inflection principles used to inflect the uninflected words stored in the memory. An alphabetical keyboard is provided for entering the uninflected form of the word. An inflection selction keyboard is provided for entering desired inflection information that is used to select data reflecting the appropriate inflection principles stored digitally in the third memory. An inflection enabling circuit is responsive to the selection functions of the inflection selection keyboard for inflecting the uninflected word according to the desired inflection principles derived from the third memory, to obtain the properly inflected word.

BRIEF DESCRIPTION OF THE DRAWINGS

The present invention will become more fully understood from the detailed description given hereinbelow together with the accompanying drawings which are given by way of illustration only, and thus are not limitative of the present invention and wherein.

DETAILED DESCRIPTION OF THE INVENTION

First of all, any language can be applied to an electronic translator of the present invention. An input "source" word is spelled in a specific language to obtain an equivalent word, or a translated word, spelled in a different language corresponding thereto. The language can be freely selected. According to an example of the present invention that will be discussed hereinbelow, it is assumed that the "source" language is German and the translated language is English.

Figure 1:
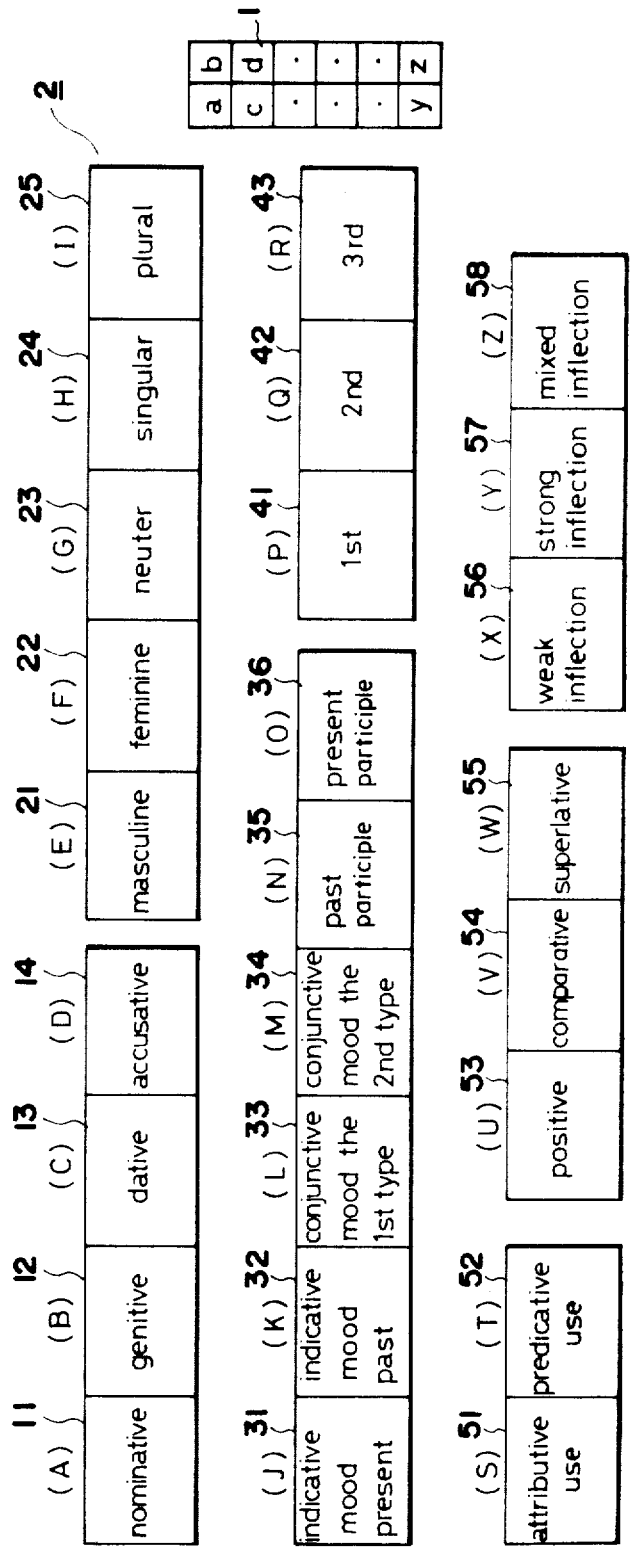
FIG. 1 shows a plan view of an input keyboard according to the present invention, inclusive of an inflection selection keyboard.

Referring now to FIG. 1, there is illustrated a plan view of an input keyboard of the present invention, inclusive of an inflection selection keyboard. The input keyboard of FIG. 1 comprises a German alphabetical word keyboard 1 containing a plurality of key switches corresponding to all characters in the German alphabet and umlaut. The inflection selection keyboard 2 containing a plurality of inflection selection key switches, 11-14, 21-25, 31-36, 41-43 and 51-58.

In operation, the German alphabetical word keyboard 1 is actuated to enter a desired German word of uninflected form. The inflection selection keyboard 2 is then actuated to introduce information used to enable a particular inflection of the German word that has been entered by the German alphabetical keyboard 1. The keyboard 2 includes groups of key switches 11 through 14, 21 through 25, 31 through 36, 41 through 43, and 51 through 58. The key switches 11 to 14, respectively, correspond in the first group to the nominative, the genitive, the dative, and the accusative cases. The second group comprising key switches 21, 22 and 23, respectively, corresponds to the masculine, the third femine, and the neuter genders. The group of key switches 24 and 25, respectively, correspond to the singular and the plural. The key switches 31 to 36 correspond to the indicative mood "die Wirklichkeitsform" (in German) present, the indicative mood past, the conjunctive or subjunctive mood "die Möglichkeitsform" in German the first type, the conjunctive mood the second type, the past participle, and the present participle, respectively.

The fourth group of key switches 41 to 43 are related to the first person, the second person, and the third person, respectively. The fifth group of key switches 51 and 52 correspond to the attributive use and the predicative use, respectively. The sixth group of key switches 53 to 55 are aimed to the positive, the comparative, and the superlative, degrees of comparison respectively. The key switches 56 to 58 in the correspond to the weak inflection, the strong inflection, and the mixed inflection.

As stated above, the German alphabetical keyboard 1 may be separated from the inflection keyboard 2. Alternatively, the keyboard 1 may be contained within the keyboard 2 as referenced by alphabetical characters within brackets adjacent to the key switches of the keyboard 2 of FIG. 1. The following description is directed to the situation where the alphabetical keyboard 1 is separated from the inflection keyboard 2.

Figure 2:
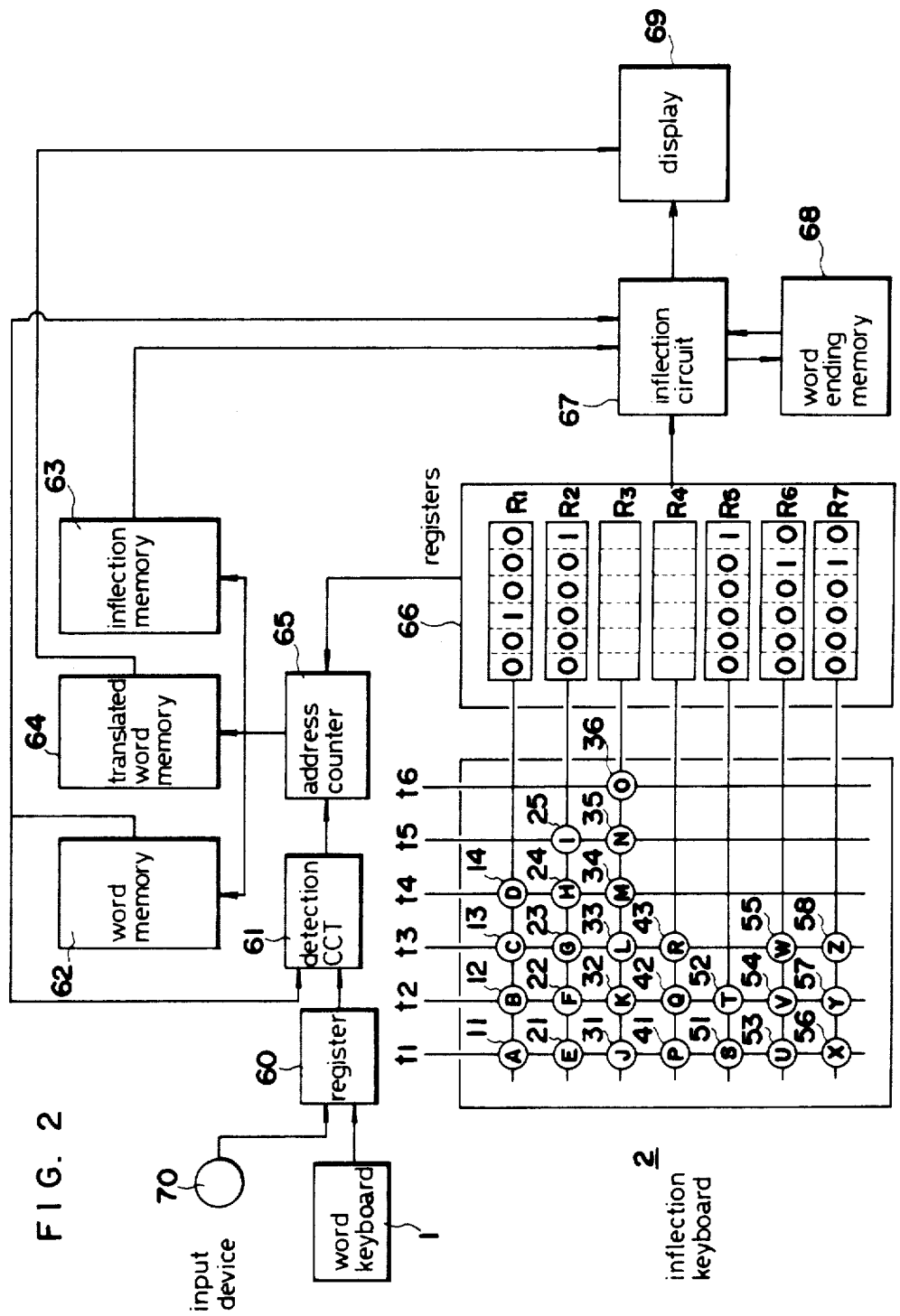
FIG. 2 shows a circuit diagram of an inflection control circuit employed in connection with the input keyboard of FIG. 1.

FIG. 2 illustrates a circuit diagram of an inflection control circuit according to the present invention, which may be actuated by means of the input keyboard of FIG. 1. This circuit comprises the German alphabetical word keyboard 1, the inflection keyboard 2 both as described above, a register 60, a detection circuit 61, a word memory 62, an inflection memory 63, a translated word memory 64, an address counter 65, a group of shift registers 66, an inflection circuit 67, a word ending memory 68, and a display 69.

The register 60 is connected and responds to the German word keyboard 1 or any other word input device 70 for containing coded digital information equivalent to the German word entered in its uninflected form. The word memory 62 stores a plurality of German words in their uninflected form, at a separate address. The detection circuit 61 is connected to both the register 60 and the word memory 62 and compares the German word entered through the word keyboard with one of the German words retrieved from the word memory 62. The inflection memory 63 contains digital information reflecting a plurality of parts of speech with respect to the German words contained within the word memory 62, and a plurality of kinds of rules according to which the stored German words are inflected. The translated word memory 64 contains digital information for a plurality of English words each of which is equivalent to one of the German words stored in the word memory 62. The address counter 65 is connected to the output of the detection circuit 61 and is provided for causing each of these memories 62, 63 and 64 to be addressed at the same time.

The detection circuit 61 receives the German word sent by the register 60 and one of the German words retrieved from the word memory 62. When they are not equivalent, the circuit 61 causes the address counter 65 to improve the address in the word memory 62 by one. Another German word is thereby retrieved from the word memory 62 and applied to the detection circuit 61. The detection circuit 61 repeats its equivalence detection operation until a coincidence of data is accomplished.

Each of the group of shift registers 66 is connected to the inflection keyboard 2 for receiving inflection selection signals entered by the keyboard 2 in a respective one of the groups of key switches. A register $R_1$ is aligned to receive and store signals entered by the key switches 11 through 14. A second register $R_2$ is aligned similarly to store signals entered by the key switches 21 through 25. A register $R_3$ is used to contain signals from the key switches 31 through 36. A register $R_4$ responds to the key switches 41 through 43. A register $R_5$ responds to the key switches 51 and 52. A register $R_6$ responds to the key switches 53 through 55. A register $R_7$ is aimed to contain signals from the key switches 56 and 58.

A plurality of key strobing signals $t_1$ through $t_6$ are applied to the inflection keyboard 2. When the switch 11 is actuated, for example, it leads to the storage of a signal in the first bit B1 of the shift register $R_1$ at a timing of $t_1$. The inflection circuit 67 is operated for inflecting the German word from its uninflected form according to the selections made on the inflection keyboard 2. The word ending memory 68 stores a plurality of word endings that may be added, for inflection purposes, to the ending of the German words transferred to the inflection circuit 67. The word endings are sent to the circuit 67 in response to signals from that circuit. The kinds of word endings stored in the word ending memory 68 are shown in Table 5. Finally, the display 69 is responsive to the inflection circuit 67 and the translated word memory 64 for indicating the inflected German word and its translated English word.

The inflection keyboard 2 is actuated to inflect the German words as shown in Tables 1 through 4.

TABLE 1

|  | noun | |
|---|---|---|
|  | singular | plural |
| nominative | Haus | Häuser |
| genitive | Hauses | Häuser |
| dative | Hause | Häusern |
| accusative | Haus | Häuser |

TABLE 2

|  | definite article | | | |
|---|---|---|---|---|
|  | masculine | feminine | neuter | plural |
| nominative | der | die | das | die |
| genitive | des | der | des | der |
| dative | dem | der | dem | den |
| accusative | den | die | das | die |

TABLE 3

| person | | infinitive | indicative mood present | indicative mood past | Verb conjunctive mood the 1st type present | conjunctive mood the 2nd type present | part particle | present particle |
|---|---|---|---|---|---|---|---|---|
| | | fahren | | | | | gafahren | fahrend |
| singular | 1st | | fahre | fuhr | fahre | führe | | |
| | 2nd | | fahrst | fuhrst | fahrest | führest | | |
| | 3rd | | fahrt | fuhr | fahre | führe | | |
| plural | 1st | | fahren | fuhren | fahren | führen | | |
| | 2nd | | fahrt | fuhrt | fahret | führet | | |
| | 3rd | | fahren | fuhrne | fahren | führen | | |

TABLE 4

| | | | Adjective weak inflection | | | | strong inflection | | | |
|---|---|---|---|---|---|---|---|---|---|---|
| | | | masculine | feminine | neuter | plural | masculine | feminine | neuter | plural |
| attributive use | positive | nom. | hoche | hoche | hoche | hochen | hocher | hoehe | hoches | hoche |
| | | gen. | hochen | hochen | hochen | hochen | hochen | hocher | hochen | hocher |
| | | dat. | hochen | hochen | hochen | hochen | hochem | hocher | hochem | hochen |
| | | acc. | hochen | hoche | hoche | hochen | hochen | hoche | hoches | hoche |
| | comparative | nom. | höhere | höhere | höhere | höheren | höherer | höhere | höheres | höhere |
| | | gen. | höheren | höheren | höheren | höheren | höheren | höherer | höheren | höherer |
| | | dat. | höheren | höheren | höheren | höheren | höherem | höherer | höherem | höheren |
| | | acc. | höheren | höhere | höhere | höheren | höheren | höhere | höheres | höhere |
| | superlative | nom. | höchste | höchste | höchste | höchsten | höchster | höchste | höchstes | höchste |
| | | gen. | höchsten | höchsten | höchsten | höchsten | höchsten | höchster | höchsten | höchster |
| | | dat. | höchsten | höchsten | höchsten | höchsten | höchstem | höchster | höchstem | höchsten |
| | | acc. | höchsten | höchste | höchste | höchsten | höchsten | höchste | höchstes | höchste |
| predicative use | positive | hoch | | | | | | | | |
| | comparative | höher | | | | | | | | |
| | superlative | höchst | | | | | | | | |

Although it is possible in German to make inflection with respect to the imperative mood of verb and the mixed inflection in the attributive use of the adjective, these kinds of inflection are omitted.

Figure 3:
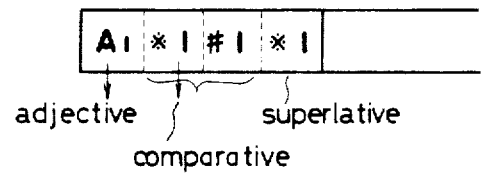
FIG. 3 shows schematically parts of the contents of an inflection memory contained within the inflection enabling circuit of FIG. 2, representing information with respect to the inflection of an adjective.

A portion of the contents of the inflection memory 63 are as shown schematically in FIG. 3, wherein there are provided a portion A1, a portion "*1" (the first occurrence), a portion "#1", and a portion "*1" (second occurrence). The portion A1 contains information representing the kind of the word, for example, the adjective. The first portion "*1" contains information representing where the umlaut is added within the inflected word in the comparative. The portion "#1" contains information representing what letter or letters are to be removed from the inflected word. The second portion "*1" contains information indicating where the umlaut is added within the inflected word in the superlative.

In the case of the word "hoch" in the uninflected form, the portion A1 stores information that is an adjective. The first portion "*1" contains information indicating that one of letters "a", "u" and "o" is included within the word "hoch" and where the umlaut is to be added within the inflected word in the comparative. The portion "#1" stores information designating that a letter "c" is contained within the word "hoch" and this letter should be removed from the inflected word in the comparative. The second portion "*1" stores information indicating where the umlaut is added within the inflected word in the superlative.

Table 5 shows the sort of word ending information that can be supplied by the word ending memory 68 in the case of the adjective, "hoch". A figure at the upper left side designates an address. A letter "e" is added to the endings of the respective inflected words. The letter "e" is omitted from Table 5 and, a letter following the letter "e" is contained.

TABLE 5

| | masuline | feminine | neuter | plural | |
|---|---|---|---|---|---|
| nominative | 0 - | 1 - | 2 - | n | ⎫ |
| genitive | n | n | n | n | ⎬ weak inflection |
| dative | n | n | n | n | ⎭ |
| accusative | n | — | — | 15ₙ | |
| nominative | 16ᵣ | — | s | — | ⎫ |
| genitive | n | r | n | r | ⎬ strong inflection |
| dative | m | r | m | n | ⎭ |
| accusative | n | — | s | 31ₙ | |
| nominative | r | — | s | | ⎫ |
| genitive | n | n | n | | ⎬ mixed inflection |
| dative | n | n | n | | ⎭ |
| accusative | n | — | s | 47 | |

Figure 4:
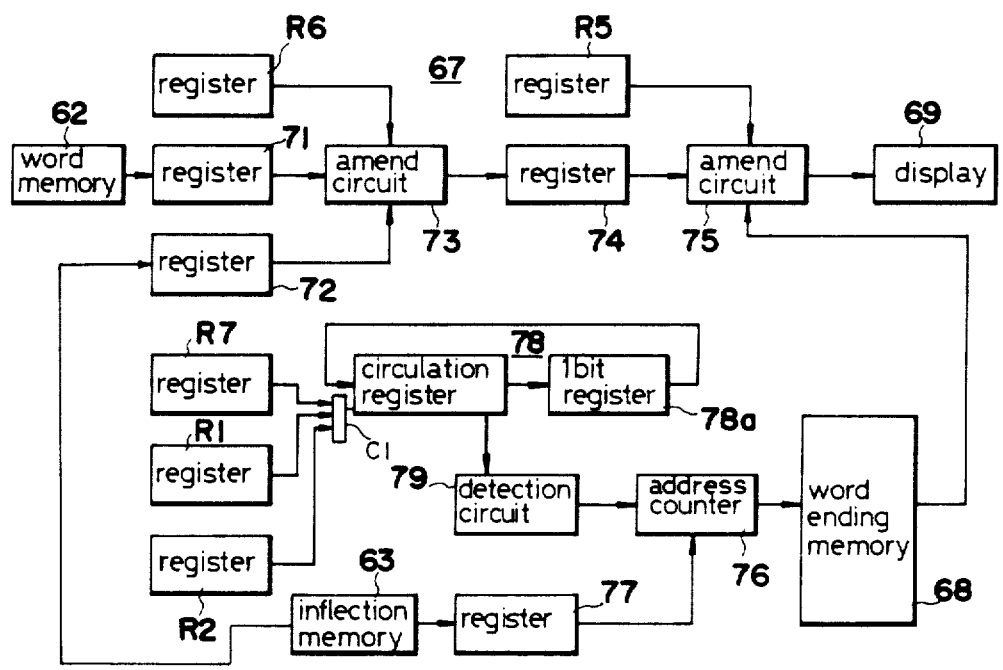
FIG. 4 shows a circuit diagram of an inflection enabling circuit contained within the inflection control circuit of FIG. 2.

FIG. 4 indicates a preferred circuit configuration for the inflection circuit 67. The circuit 67 comprises registers 71, 72, 74 and 77, amend circuits 73 and 75, an address counter 76, a circulation register 78, and a detection circuit 79. These elements are interconnected in the manner shown in FIG. 4.

The register 71 is coupled to the word memory 62 for storing the German word in its uninflected form. The register 72 is connected to the inflection memory 63 for receiving and containing the digital information concerning inflection with respect to the German word, say, the aforementioned adjective. The information of the registers 71 and 72 is applied to the first amend circuit 73 so that inflection from the uninflected form is performed therein with reference to the information applied under the control of signals received by the amend circuit 73 from the shift register $R_6$. The resultant signals are applied to the register 74. The second amend circuit 75 receives the resultant signals generated from the register 74 and output signals generated by the shift register $R_5$ indicating whether the predicative use of the adjective is to be applied or not. To the information applied by the register 74, the second amend circuit 75 inflects the German word by adding the endings of the word to the German word, the endings of word being retrieved from the word ending memory 68 by the information applied by the register $R_5$.

The address counter 76 is provided for addressing the word ending memory 68. The address counter 76 is connected to the register 77 which in turn is connected to the inflection memory 63. When the portion A1 of the inflection memory 63, as shown in FIG. 3, generates information representative of the kind of the word, say, the adjective, it is applied to the address counter 76 through the resistor 77. Then the address of the address counter 76 is set to a certain address, say, zero. Zero address of Table 5 is selected and, thereafter, advanced according to the contents of the shift registers $R_1$, $R_2$ and $R_7$.

A control circuit C1 is interposed between the registers $R_1$, $R_2$ and $R_7$, and the circulation register 78. While the portion A1 of the inflection memory 63 provides information of the kind of the word, the adjective, the contents of the shift register $R_7$, whether the strong inflection is applied or not, is applied to the circulation register 78. A first bit positioned in the lowest digit is sent to the detection circuit 79 to determine whether it is "1" or "0". In the case where the first bit of the register $R_7$ is "0", representing that the weak inflection is not used, the address of the address counter 76 is increased to 16th address.

The contents of the circulation register 78 are right shifted by means of an 1-bit register 78a. A second bit of the register $R_7$ is then entered in the detection circuit 79 to determine whether it is "1" or "0". If it is "0", representing that the strong inflection is not used, the address of the address counter 76 is increased to 32nd address.

If the first bit of the lowest digit of the register $R_7$ is "1", the contents of the register $R_1$ are applied to the circulation register 78 by means of the control circuit C1, then a first bit of the lowest digit of the register $R_1$ is detected by the detection circuit 79. When the first bit of the register $R_1$ is "0", representing that the nominative is not used, the address of the address counter 76 is increased improved to 4th address, to enable the detection of the genitive. The contents of the circulation register 78 are again right-shifted by one bit, wherein the second bit of the register $R_1$ is detected.

When a certain bit of the register $R_1$ is determined to be "1", the contents of the register $R_2$ are then applied to the circulation register 78 by means of the control circuit C1, wherein a first bit of the lowest digit from register $R_2$ is detected by the detection circuit 79. When the first bit of the register $R_2$ is "0", indicating that the masculine is not used, the address of the address counter 76 is increased by one. The contents of the circulation register 78 are right-shifted by one bit, wherein a second bit of the register $R_2$ is detected by the detection circuit 79. When the second bit of the register $R_2$ is "1", information of the ending of the word is retrieved from the word ending memory 68 under the selection by the address counter 76. The information thus retrieved from a particular address in the word ending memory 68 is applied to the second amend circuit 75.

A unique type of inflection with respect to a word such as "hoch" in the uninflected form can be accomplished by the present invention and is performed as follows to make it appropriate for "hoch) Berg".

Since this word is of the accusative, the masculine, the attributive use, the comparative, and the strong inflection, the uninflected form "hoch" is entered by the actuation of key switches "h", "o", "c" and "h" within the German alphabetical word keyboard 1 and, in addition, the key switches 14, 21, 51, 54 and 57 within the inflection selection keyboard 2 are actuated. By means of the actuation of the German alphabetical word keyboard 1, the uninflected form is applied to the detection circuit 61 through the register 60 in digitally coded information.

The memories 62, 63 and 64 are addressed by the address counter 65 commencing from the first address. An uninflected form is retrieved from the word memory 62 and entered into the detection circuit 61. The circuit 61 compares the word "hoch" previously entered and the uninflected word, retrieved from the first address in the memory 62. When they are not equivalent, the detection circuit 61 provides signals that are applied to the address counter 65. The address of the address counter 65 is thereby improved by one. The word at the next address is then retrieved from the memory 62.

When the word entered in the detection circuit 61 and that retrieved from the word memory 62 are equivalent, the word "hoch"; is applied to the inflection circuit 67. At the same time, a part of speech and the information as described with respect to FIG. 3 are also retrieved from the memory 63 and entered into the inflection circuit 67. In the circuit 67, the first amend circuit 73 receives signals from the register 71 representing the word "hoch' in the uninflected form and signals from the second bit $B_2$ of the register $R_6$ representing the comparative.

While the word "hoch" is being retrieved from the memory 62, the memory 63 provides the information as shown in FIG. 3 and that information is entered in the register 72 and then the first amend circuit 73. Accordingly, the umlaut is added to the letter "o" as defined by the signals of the first portion "*1" in the first amend circuit 73. The letter "c" is deleted under the control of the signals of the portion "*1". The word is then amended to be "hoher" under the signals supplied by the register $R_6$ indicative of the comparative. The inflected word is then applied to the second amend circuit 75 through the register 74.

Since the register 77 also receives information within the portion A1 indicative of the adjective from the memory 63, the information of the portion A1 is entered to the address counter 76. The address of the address counter 76 is made "0". Signals stored in the register $R_7$ indicative of the strong inflection are transferred to the circulation register 78. In the case where the lowest digit of the circulation register 78 is detected to be "0" by the detection circuit 79, the address of the address counter 76 is improved to 16th digit, so that 16th address of the word ending memory 68 is selected and addressed.

The contents of the circulation register 78 are right sifted by the 1-bit register 78a by one. When the lowest bit of the register 78 is determined to be "1", the contents of the circulation register 78 are replaced by those of the register $R_1$, wherein the lowest bit of the register $R_1$ is detected by the detection circuit 79. The lowest bit of the register R₁ is "0", and the address of the address counter 76 is advanced to 4th address. The contents of the register 78 are right-shifted by one, wherein the lowest bit of the register R₁ is detected by the circuit 79. The address of the address counter 76 is further advanced by 4 addresses. These operations are repeated. When 4th bit of the register R₁, "1", reaches the lowest bit of the circulation register 78, the address counter 76 contains "28" as the address. The contents of the register R₂ are applied to the register 78. The lowest bit of the register 78 is determined to be "1" by the circuit 79. The advancement of the address counter 76 is stopped. The contents of 28th address in the memory 68, "n", are transferred to the second amend circuit 75.

In the circuit 75, "en" (the "e" having been omitted in memory 68) is added to the previous word "höher" to obtain "höheren", so that the resultant word is indicated in the display 69. The operator knows that "höheren Berg" is appropriate. The translated English word is simultaneously retrieved from the memory 64 due to the cross-referencing to addresses in the word memory 62 and shown in the display 69.

In the above-referenced case, "hoch" is in the attributive use so that the lowest bit of the register R₅ is "1". This "1" signal is applied to the second amend circuit 75. The predicative use is selected by the actuation of the key switch 52, in which case the operation of the second amend circuit 75 is prevented and the inflected form from the first amend circuit 73 is sent to and indicated in the display 69 without further inflection.

Figure 5:
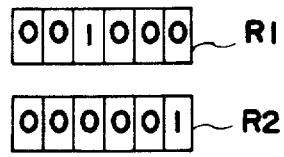
FIG. 5 shows schematically parts of the contents of a register contained within the inflection control circuit of FIG. 2.

An appropriate definite article to be applied to a word of the masculine, the singular, and the accusative is searched by the actuation of the key switches "d", "e", and "r", and key switches 14, 21 and 24. "Der" in the uninflected form is applied from the memory 62 to the inflection circuit 67. Signals are then applied to the registers R₁ and R₂ as shown in FIG. 5. Inflected forms "des", "dem", and "den" from the uninflected form "der" are generated by the inflection memory 63 and applied to the inflection circuit 67. The circuit 67, in response to the registers R₁ and R₂, detects that the word is to be inflected according to the masculine, the singular, and the accusative. Therefore, "den" is selected and developed by the circuit 67 so that it is pointed out in the display 69.

Figure 6:
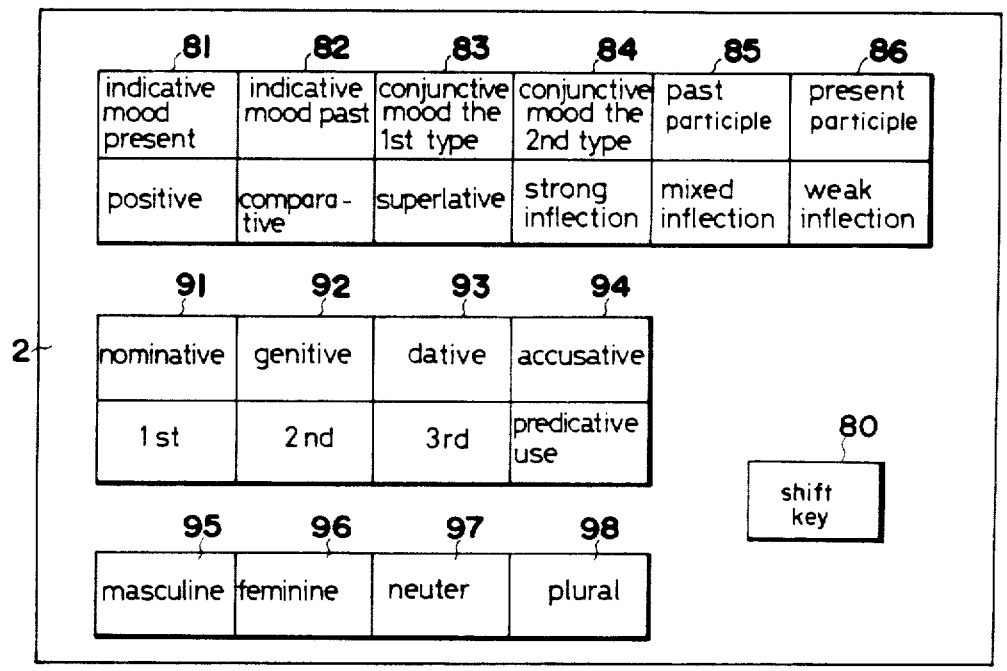
FIG. 6 shows a plan view of another preferred embodiment of the input keyboard according to the present invention.

FIG. 6 shows a plan view of another type of the inflection selection keyboard 2', in which a shift key switch 80 is additionally provided to identify operation of key switches 81 through 86, and 91 through 98.

While the shift key switch 80 is not actuated, the actuation of a key switch, say, 81 means that the introduction of the indicative mood present as marked in the upper position is enabled. Once the shift key switch 80 is operated, the actuation of the key switch 81 means that the introduction of the positive as marked in the lower position is enabled.

In FIG. 6, as compared to FIG. 1, keys for the attributive use and the singular are omitted. Unless the plural key 98 is actuated, it leads to the detection that the singular is selected. Unless the predicative use key 94 is operated, the attributive use is regarded as having been selected.

Figure 7:
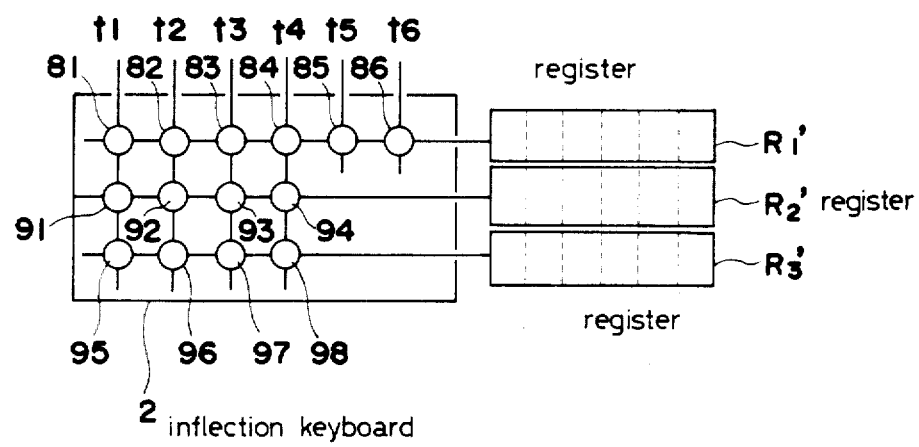
FIG. 7 shows a circuit diagram of the principal parts of another type of inflection control circuit particularly adapted for use with respect to the input keyboard of FIG. 6.

FIG. 7 shows a circuit diagram of another type of the inflection control circuit suitable for the keyboard of FIG. 6. In FIG. 7, three registers R₁', R₂' and R₃' are provided. The remaining circuit elements similar to those of FIG. 2 are omitted.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic word inflection device wherein an uninflected word represented in a first language is entered to obtain at least one inflected form of the uninflected word, the device comprising:

first memory means for storing digital data representing a plurality of words in the language in their respective uninflected forms;

input means for entering an uninflected word, the input means being operatively connected to the first memory means, said device comprising means for determining that the input uninflected word is stored within the first memory means of the device;

inflection memory means for storing digital data representing a certain number of principles used in the language to inflect the uninflected forms of the words stored in the first memory means;

inflection selection means, responsive to the input means, for selecting and retrieving that digital data stored in the inflection memory means that corresponds to the inflected form of the uninflected input word, said inflection selection means including several groups of key switches operatively associated with said input means, each of the groups corresponding to one set of the principles used in the language to inflect words, and separate register means, responsive to the several groups of key switches, for storing the digital data retrieved from the first memory means;

inflection enabling means, responsive to the inflection selection means, for modifying the digital form of the uninflected input word to obtain a digital representation of the inflected form of the input word, said inflection enabling means including an amend circuit means operatively connected to the register means for modifying the digital data representing the word from that of the inflected form in response to digital data in the register means; and display means, responsive to the inflection selection means, for modifying the digital form of the uninflected input word to obtain a digital representation of the inflected form of the input word.

2. The device according to claim 1, wherein the device further comprises a translated word memory means operatively connected to the input means for storing digital data representing a plurality of words in a second language, each such word being equivalent to one of the words stored in the first memory means, and wherein the display means is further adapted to show the word in the second language equivalent to the uninflected word entered through the input means.

3. The device according to claim 1, wherein the inflection enabling means further comprises a second inflection memory means operatively connected to the inflection selection means for storing digital data representing a plurality of endings for inflected words in the language stored in the first memory, the inflection enabling means serving to retrieve the appropriate digital data from the second inflection memory means to produce the digital form of the inflected word.

4. The device according to claim 1, wherein the amend circuit means is further operatively connected to a second inflection selection means storing a plurality of endings for inflected words that may be added to one of the uninflected words in the language stored in the first memory, the inflection enabling means serving to retrieve the appropriate digital data from the second inflection memory means to produce the digital form of the inflected word.

* * * * *